United States Patent [19]

Fumarolo et al.

[11] Patent Number: 5,423,061
[45] Date of Patent: Jun. 6, 1995

[54] METHOD FOR PROVIDING DISPATCH SERVICES TO COMMUNICATION GROUPS AND MULTIPLE COMMUNICATION GROUPS

[75] Inventors: Arthur L. Fumarolo, Schaumburg; Armando Vera, Mount Prospect; Aruna Duarrani, Elk Grove, all of Ill.

[73] Assignee: Motorola, Inc., Schaumburg, Ill.

[21] Appl. No.: 69,324

[22] Filed: Jun. 1, 1993

[51] Int. Cl.$^6$ ............................................. H04B 7/26
[52] U.S. Cl. ...................................... 455/54.1; 455/9; 455/53.1
[58] Field of Search ................ 455/9, 53.1, 54.1, 54.2, 455/56.1, 57.1, 186.1, 33.1, 33.4, 34.2; 379/63; 340/825.06

[56] References Cited

U.S. PATENT DOCUMENTS

| | | | |
|---|---|---|---|
| 4,926,495 | 5/1990 | Comroe et al. | 455/54.2 |
| 5,014,345 | 5/1991 | Comroe et al. | 455/54.2 |
| 5,274,837 | 12/1993 | Childress et al. | 455/54.2 X |

Primary Examiner—Reinhard J. Eisenzopf
Assistant Examiner—Chi H. Pham
Attorney, Agent, or Firm—Timothy W. Markison; Wayne J. Egan; Christopher P. Moreno

[57] ABSTRACT

In a communication system, an operator station provides dispatch services to communication groups and multi-communication groups. When a request is received by the operator station to provide a particular dispatch service, which requires at least one multi-communication group to be modified, a temporary multi-communication group is created based on the request and predetermined communication system limitations. After the particular dispatch service has been performed for the temporary multi-communication group, the temporary multi-communication group is discarded, returning the temporary multi-communication group to the at least one multi-communication group.

12 Claims, 3 Drawing Sheets

METHOD FOR PROVIDING DISPATCH
SERVICES TO COMMUNICATION GROUPS AND
MULTIPLE COMMUNICATION GROUPS

FIELD OF THE INVENTION

The present invention relates generally to communication system and, in particular, to the provision of dispatch services to multiple communication groups within the communication system.

BACKGROUND OF THE INVENTION

Communication systems are know to comprise a plurality of communication units, a limited number of communication resources (channels), an operator station, a communication resource controller, and a plurality of broadcast units. Such systems include trunked and conventional communication systems. Frequently, communication units that are functionally related to one another (i.e. separate law enforcement groups such as traffic enforcement, detectives, etc.) are grouped together to form a communication group. Communication groups can be further combined to create multi-communication groups (i.e. local and county-wide police departments). An operator, via the operator station, may select a communication group or a multi-communication group to receive a message transmission thus allowing many communication units to receive the message at substantially identical times.

However, as the size and complexity of such communication systems have grown to meet increasing user needs, the desire for increased multi-communication group capabilities has also grown. Current communication systems allow only one multi-communication group to be "open" at a time at a given operator station. That is, no more than one multi-communication group can be selected to receive a message at any time. The ability to select more than one multi-communication group would be useful when, for instance, there were multi-communication groups corresponding to law enforcement entities in the Northern, Southern, and Western regions of a state. If the operator receives an emergency call which requires an all points bulletin (APB) to be quickly sent to all three regions simultaneously, the operator requires the capacity to open more than one multi-communication group at the same time. The operator may also wish a particular public safety communication group, such as a local fire department, to be among the groups about to receive the APB. In addition, it is currently not possible to temporarily modify multi-communication groups prior to message transmission. Unfortunately, prior art communication systems cannot fulfill the needs of this type of operator.

Therefore, a need exists for a method which allows a plurality of multi-communication groups to be selected simultaneously and also allows multi-communication groups to be temporarily modified prior to message transmission.

DESCRIPTION OF A PREFERRED EMBODIMENT

Generally, the present invention provides a method for an operator station to provide dispatch services for communication groups. This is accomplished by changing the operator station to operate in a newly-created additive mode. The additive mode allows the operator station to combine and modify communication groups and/or multi-communication groups and provide service to the resulting temporary set, subject to predetermined communication system limitations. While in this mode, the addition and deletion of communication groups is allowed, subject to system limitations. Once the temporary multi-communication group is identified, the operator station performs a particular dispatch service. After the dispatch service has been performed, the temporary multi-communication group is dissolved.

Figure 1:
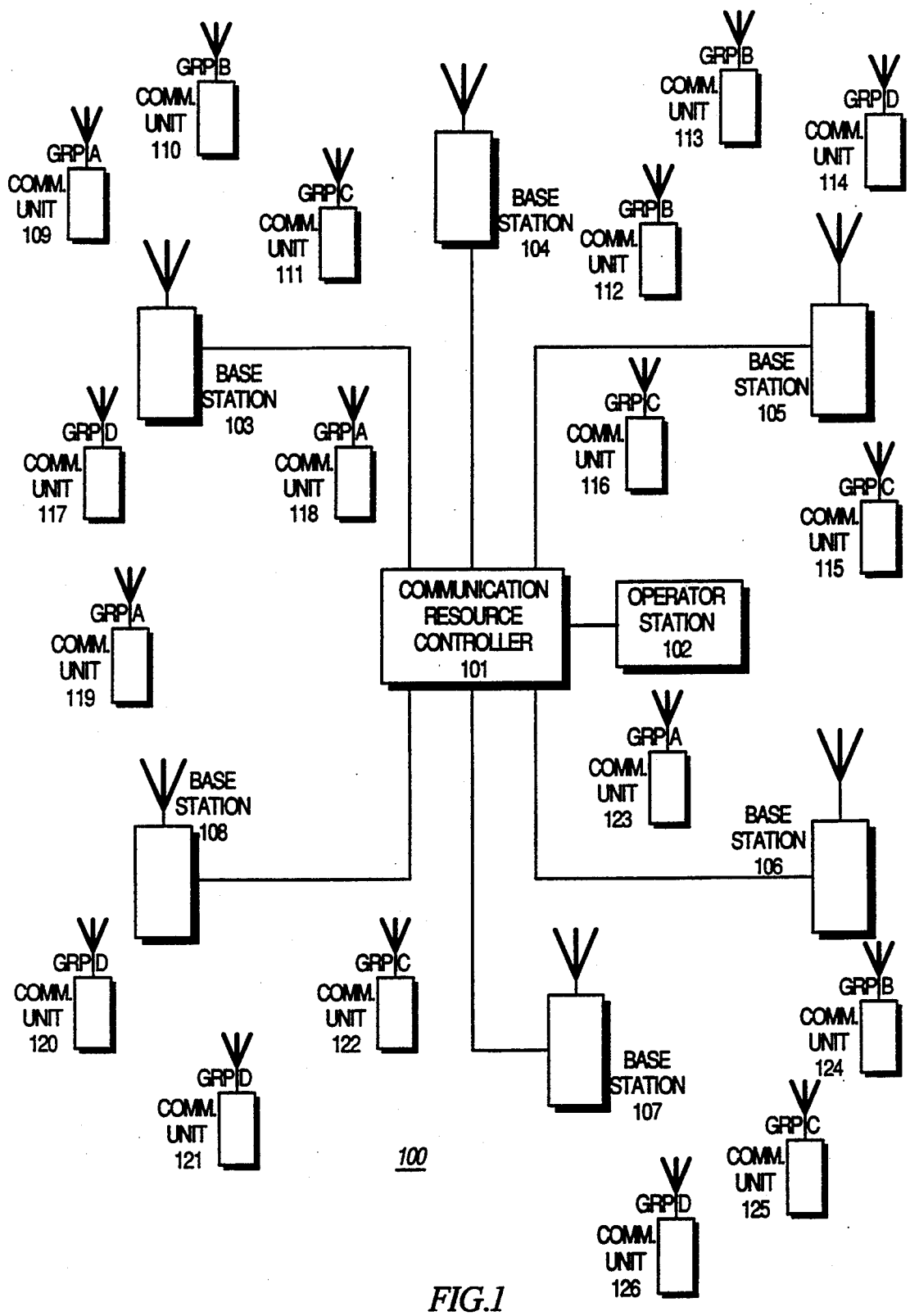
FIG. 1 illustrates a communication system in accordance with the present invention.

The present invention can be more fully described with reference to FIGS. 1–3. FIG. 1 illustrates a communication system 100 that includes a communication resource controller 101, at least one operator station 102, a plurality of base stations 103–108, and a plurality of communication units 109–126. The communication system 100 may be either a trunking or a conventional communication system.

In a trunking communication system 100, the communication resource controller 101 is a combination of a trunked central controller (TCC), such as a Smart Zone Zone Controller, and a Central Electronics Bank (CEB), such as a Centracom Series II Plus Embassy, manufactured by Motorola Inc. The CEB forwards requests from the operator station 102 to the TCC in order to gain access to the base stations 103–108. After the TCC grants the use of at least one of the base stations 103–108, the operator station 102 proceeds to provide dispatch services. Upon completion of the required dispatch services, the CEB, via the TCC, deallocates the base stations 103–108.

The communication units 109–126 are arranged in communication groups. For example, the communication units 109–126 may be arranged into communication groups A–D, as shown in FIG. 1. In a trunking system, all units in a communication group (assume group B) do not have a dedicated base station 103–108. The first communication unit (assume communication unit 124) in group B to request a base station 103–108 will be assigned, via the communication resource controller 101, one of the trunked base stations 103–108, if one is available. After a trunked base station (assume base station 106) has been assigned, the information sourced by communication unit 124 is repeated by the base station 106 (repeater) to the rest of the units in communication group B as well as the operator station 102.

The operator station 102, which may be a Centracom Series II Plus console manufactured by Motorola Inc., monitors and communicates with the communication groups. This is generally done by selecting the communication groups that are the primary receivers of dispatch services from the operator station 102. These dispatch services include monitoring emergencies/audio from communication units in the primary communication groups; transmitting audio messages to communication units in the primary communication groups; sending paging messages to individual communication units within the primary communication groups; patching audio from the primary communication groups with that of another primary communication group or nonprimary communication groups or a telephone's audio; and managing the activation and deactivation of individual communication units. All of the previously discussed dispatch services are well understood in the art thus no further discussion will be presented. The operator station 102 commonly has a set of primary and secondary communication groups with which it can communicate. The operator station 102 user typically chooses one communication group as the primary group and the operator station 102 dedicates an audio presentation (speaker or headset) to the primary communication group. The primary communication group is also given various easy-access transmit control buttons which facilitate access by the operator station 102 user. The secondary communications groups may still be accessed by the operator station 102 user, but without the aid of the additional dedicated controls.

In a conventional system 100, the communication resource controller 101 comprises a CEB. Like the trunking communication system, the communication units are arranged in groups. However, groups in a conventional system access the communication resources in a different way. In a conventional system 100, all units in a communication group (assume group A) have access to a dedicated base station 103–108 (assume base station 103). In this type of system, the first communication unit (assume communication unit 109) from group A to start a call will get access to the base station 103. Depending upon the characteristics of the base station 103, the information sourced by communication unit 109 will either be repeated to the rest of the communication units in group A or will be routed to the operator station 102.

The operator station 102 in a conventional system, as in the trunking system, monitors and communicates with the communication groups. As the use of the operator station 102 does not significantly vary between a conventional system and a trunked system, reference is made to the previous description of the operator station 102 in a trunked system.

Figure 2:
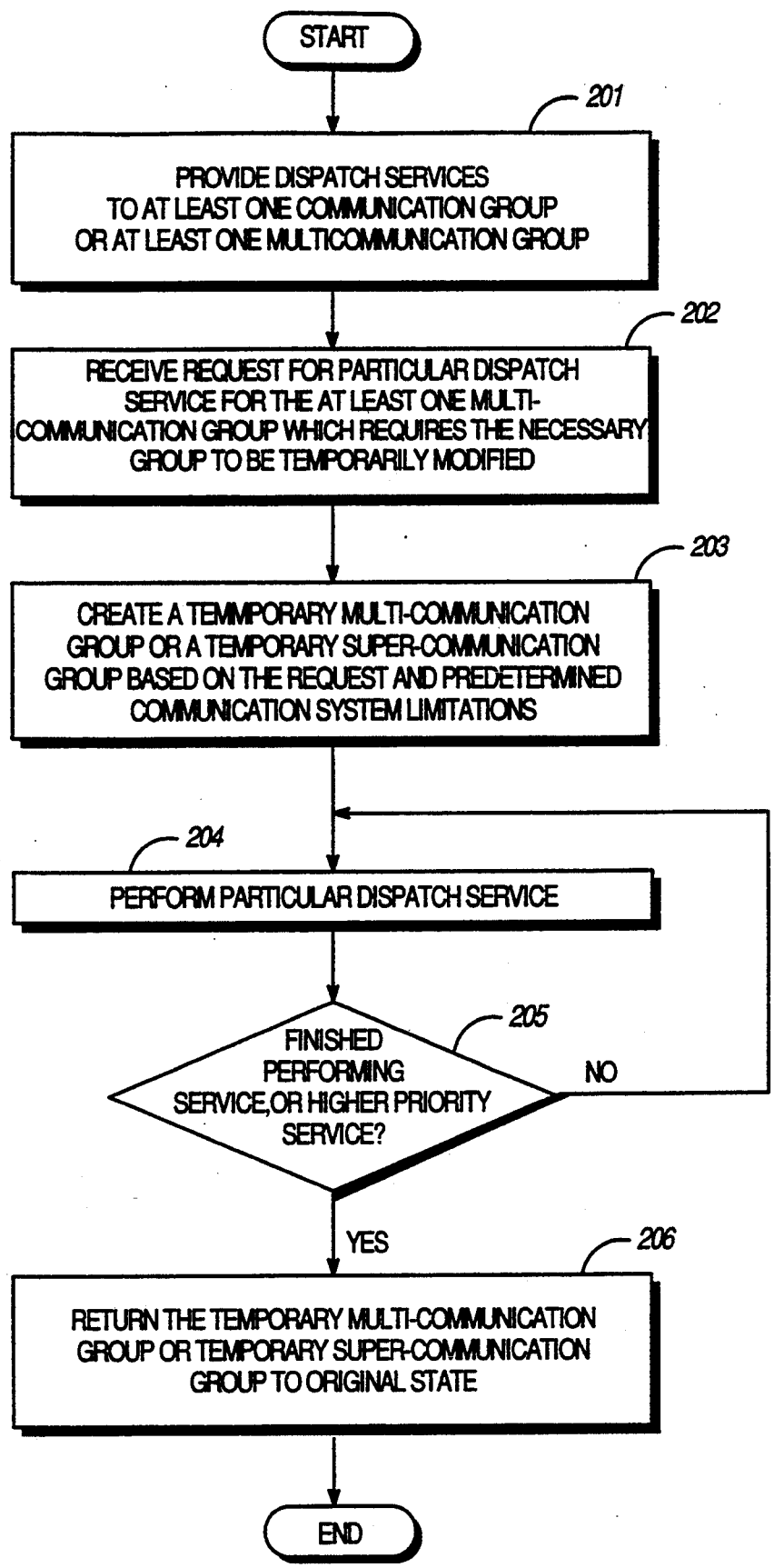
FIG. 2 illustrates a logic diagram that an operator station may utilize to implement the present invention.

FIG. 2 illustrates a logic diagram that the operator station 102 may utilize to implement the present invention. At step 201, the operator station 102 provides dispatch services to at least one communication group or multi-communication group. The dispatch services may be any of the dispatch services described above. In current systems, the operator of the operator station 102 may need to access several of the communications groups together, as if they were one large group. This is accomplished by the formation of a multi-communication group. A multi-communication group is defined as a plurality of the communications groups, taken together as if they comprised one group. When a multi-communication group is formed and selected as the primary group by the operator station 102 user, all audio from the various communication groups in the multi-communication group is summed together and presented in the location (speaker or headset) normally associated with the primary communications group. Also, quick access to simultaneously transmit to all groups in the multi-communication group is allowed via the transmit control buttons associated with the primary group, as discussed above. Furthermore, the individual communication groups which constitute the multi-communication group can still be accessed singularly. The operator station 102 maintains memory of the multi-communication group members so as to allow fast access to the multi-communication group as a whole in future situations.

At step 202, a situation arises which requires the operator station 102 user to provide at least one particular dispatch service to a group of communication groups which do not currently comprise one of the defined multi-communication groups. Such a group is also considered temporary, which indicates that none of the previously defined multi-communication groups should be permanently modified to address this particular situation.

A temporary multi-communication group or a temporary super-communication group is formed 203 in response to the request 202. The contents of the temporary multi-communication group or temporary super-communication group are stored in RAM (random-access memory) or similar memory device such that they may be discarded later. The temporary multi-communication group may constitute a multi-communication group which has been modified with the addition/deletion of other communication groups. The temporary multi-communication group may also constitute at least two multi-communication groups which have been combined with the optional addition/deletion of other communication groups. The temporary super-communication group comprises at least two communication groups which have been combined with the optional addition of at least one multi-communication group. When a multi-communication group is added/deleted from the temporary multi-communication group or added to the temporary super-communication group, all members (communication groups) of the multi-communication group are added/deleted to/from the temporary multi-communication group or temporary super-communication group together. It is noted that predetermined communication system limitations (such as system loading limits, RF interference patterns, etc.) may restrict the number of communication groups which may reside together in temporary multi-communication groups or temporary super-communication groups. For instance, communication groups that are known to create contention within a given coverage area during simultaneous transmissions are restricted from sharing membership in temporary multi-communication groups or temporary super-communication groups.

Continuing with the logic diagram, the operator station 102 user performs the particular dispatch service (monitoring incoming audio, transmitting outbound audio, etc.) to the temporary multi-communication group or the temporary super-communication group 204, as would be done for a single communication group or multi-communication group. As the selected primary group of the operator station 102, inbound audio sourced by communication units affiliated with the temporary multi-communication group/temporary super-communication group is presented at the primary audio output device. Simultaneous voice/data transmission to members of the temporary multi-communication group/temporary super-communication group is also available through the easy-access buttons associated with the primary communication group.

When the need for the temporary multi-communication group/temporary super-communication group has ended, it is dissolved 205. This can be caused by the successful conclusion of the particular dispatch service requiring the temporary multi-communication group/temporary super-communication group. It may also be caused by a higher priority service request (such as an Emergency Alarm/Call situation) which requires the immediate attention and actions of the operator station 102 user.

The temporary multi-communication group/temporary super-communication group is dissolved by discarding the contents (membership) of the temporary multi-communication group/temporary super-communication group without modifying the contents (communication groups) of the original multi-communication groups 206. The operator station 102 user may now select any of the original communication groups or multi-communication groups as the primary group and continue dispatch operations.

Figure 3:
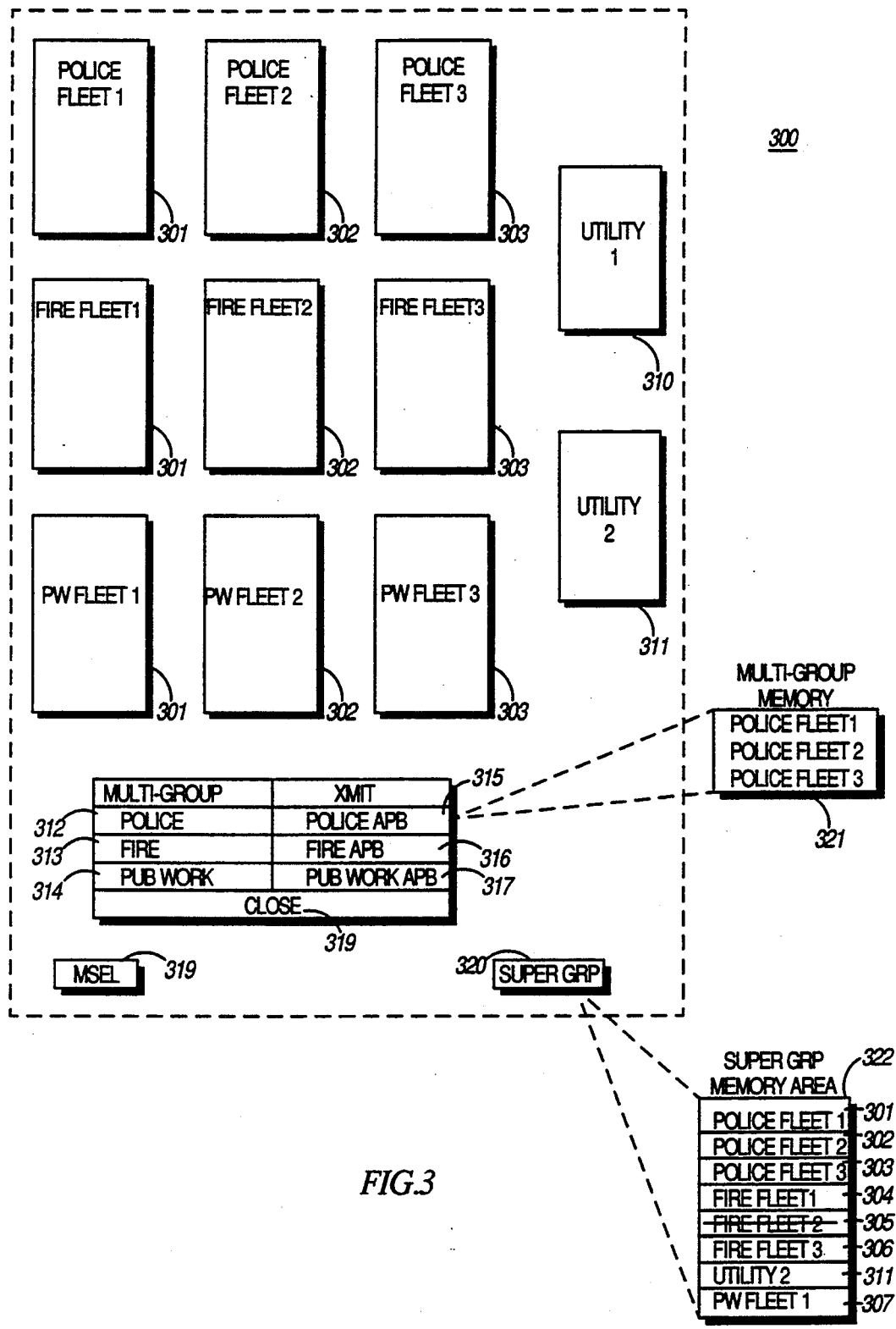
FIG. 3 illustrates a working example in accordance with the present invention.

As a working example of the above, consider FIG. 3 which illustrates an operator station 102 CRT screen 300. The CRT screen 300 shows a plurality of channel control windows (CCW) 301-311, multi-communication group selections 312-319, and a super-communication group selection 320. For each multi-communication group position 312-314, a memory area 321 is shown. This does not appear on the screen, but is within the operator station 102. Also shown is a memory area 322 for the super-communication group selection 320.

Assume that each channel control window 301-311 is assigned to a different communication group. These groups are normally accessed independently of each other. One of these communication groups is normally chosen as the primary communication group by moving a graphic cursor over the corresponding channel control window 301-311, and depressing a "choose" button. As the primary group, incoming audio for that communication group is presented in the operator station 102 user's "select" speaker, or in the headset. Transmission to the primary group is easily accomplished via associated primary transmission switches.

In this example, it can be seen that many of the communication groups are actually sub-sections of different agencies being controlled by the operator station 102. These agencies are Police (with different fleets on 301-303), Fire (with different fleets on 304-306) and Public Works (with different fleets on 307-309). The operator station 102 also has access to communication groups outside of these agencies, such as utility companies (310-311).

Certain situations may arise which require the operator station 102 user to communicate with more than one fleet of an agency simultaneously. In order to do this, multi-communication groups may be formed which contain a plurality of the individual communication groups. Each of the multi-communication groups contains a control 312-314 to allow the editing and activation (as primary) of that multi-communication group. In this example, the multi-communication groups are being used as a way to reach all communication groups in a given agency. For example, the first multi-communication group is activated via control 312. It's memory area 321 maintains a list of all communication groups which reside in this multi-communication group. Control 312 is used to make this multi-communication group the primary group of the operator station 102. The all points bulletin controls 315-317 are used to allow quick transmission to these multi-communication groups, regardless of the multi-communication group currently designated as the primary group on the operator station 102. However, if the selected multi-communication group is the primary group, a dedicated transmit button is also available to activate the transmit service. Note that each multi-communication group 312-313 has its own independent memory area (similar to 321) and its own all points bulletin control button 315-317. If a situation were to arise requiring an announcement to the entire police department, the dispatch station operator could use the functionality associated with the first multi-communication group 312 to access all of those communication groups 301-303. Similar functionality is available for the other multi-communication groups as well.

In certain situations, a temporary requirement may exist to create a temporary multi-communication group or a temporary super-communication group which does not directly correspond to one of the already defined multi-communication groups 312-314. An example of this might be an extremely large emergency, such as an airliner crash, which requires the user of the dispatch station to simultaneously communicate with all parts of the police department, some parts of the fire department, one fleet of the Public works department, and one of the utility companies. The need has thus arisen to form a temporary super-communication group.

In order to begin formation of the temporary super-communication group, the dispatch station user may either open the temporary group (initially empty) for editing via screen control 320, or may open one of the multi-communication groups 312-314 followed by selection of a second multi-communication group 312-314. The action of opening two multi-communication groups simultaneously indicates the need for a temporary multi-communication group or a temporary super-communication group. The contents (membership) of the temporary super-communication group is kept in its own memory area 322, separate from the memory area 321 of the original multi-communication groups. As multi-communication groups for police 312 and fire 313 are opened, the temporary super-communication group has all members of both multi-communication groups included in it. The CCW's for all of these communication groups are now highlighted to indicate that they are simultaneously primary (as part of the temporary super-communication group). The controls for the multi-communication groups 312-313 show a visual indication that they are active, as part of the super-communication group (i.e. the control buttons flash). In order to remove the unwanted part of the fire department (fire fleet 2) from the super-communication group, the operator station 102 user selects CCW 305. That one part of the multi-communication group is now deleted from the super-communication group, and its CCW 305 indication as being primary now extinguishes. Other individual communication groups such as utility 2 and public works fleet 1 can also be added to the super-communication group by selecting their CCW's (311, 307).

At this point, all desired members are included in the super-communication group 322, and each of their CCW's (301, 302, 303, 304, 306, 311, 307) indicates that they are simultaneously primary on the operator station 102. The incoming audio signals for these communication groups are now summed together and presented at the primary audio device of the operator station 102. Activation of the primary transmit control causes a transmission to all members of the temporary super-communication group, and will activate a transmit indication in all of the corresponding CCW's.

While the temporary super-communication group is in existence, the dispatch station operator has many means available to transmit to the different communication groups/multi-communication groups/temporary super-communication group available. To transmit to any individual communication group, press the dedicated transmit switch associated with the corresponding CCW 301-311. To transmit to any of the multi-communication groups, select the corresponding all points bulletin buttons 315-317. To transmit to the entire super-communication group, use the primary transmit controls.

After the event requiring the super-communication group has ended, or in the event of a higher priority request, the temporary super-communication group is dismantled by either choosing the super-group control 320, or choosing again each of the individual communication groups 301-311 and multi-communication groups 312-314 which were activated as part of the super-communication group. As each of the communication groups 301-311 and multi-communication groups 312-314 are removed from the temporary super-communication group, its visual indication as being currently primary will extinguish. When the temporary super-communication group becomes empty, the operator station 102 returns to its original state.

The present invention provides a method for an operator station to provide dispatch services for communication groups. With this method, several problems of the prior art are resolved. Prior operation of the dispatch station did not allow for the existence of a temporary multi-communication group or a temporary super-communication group. Such a restriction forced the permanent membership of one of the existing multi-communications groups needed to be modified whenever a new grouping, however temporary, was desired. The present invention allows for the existence of temporary multi-communication groups, which alleviates the need to permanently modify one of the normal multi-communication groups. Furthermore, the prior formation and editing of multi-communication group membership was only possible by adding/deleting a single communication group at a time to the multi-communication group. The present invention provides temporary group editing that allows rapid formation and disbanding by adding/deleting entire multi-communication groups at one time.

We claim:

1. In a communication system that includes a plurality of communication units that are arranged into communication groups, a limited number of communication resources that the communication groups access for communications, and at least one operator station, wherein the at least one operator station provides dispatch services for communication groups and multi-communication groups, a method for the at least one operator station to selectively provide dispatch services to the communication groups and the multi-communication groups, the method comprises the steps of:
   a) providing, by the operator station, the dispatch services to at least one multi-communication group;
   b) receiving, by the operator station from an operator of the operator station, a request to perform at least one particular dispatch service for the at least one multi-communication group, wherein the request requires the at least one multi-communication group to be temporarily modified;
   c) temporarily modifying, by the operator station, the at least one multi-communication group based on the request and predetermined communication system limitations, thereby forming a temporary multi-communication group in addition to the at least one multi-communication group;
   d) performing, by the operator station, the at least one particular dispatch service for the temporary multi-communication group; and
   e) when the at least one particular dispatch service has been performed or when a higher priority service request is received, returning, by the operator station, the temporary multi-communication group to the at least one multi-communication group;

and wherein, while the temporary multi-communication group exists, the operator, by use of the operator station retains the ability to conduct dispatch services with the at least one multi-communication group, and members of the temporary multi-communication group are prevented from communicating with members of the at least one multi-communication group.

2. In the method of claim 1, step (c) further comprises temporarily modifying the at least one multi-communication group by adding at least one communication group to the at least one multi-communication group.

3. In the method of claim 1, step (c) further comprises temporarily modifying the at least one multi-communication group by deleting at least one communication group from the at least one multi-communication group.

4. In the method of claim 1, step (d) further comprises performing an emergency call as the at least one particular dispatch service.

5. In a communication system that includes a plurality of communication units that are arranged into communication groups, a limited number of communication resources that the communication groups access for communications, and at least one operator station, wherein the at least one operator station provides dispatch services for communications groups and multi-communication groups, a method for the at least one operator station to selectively provide dispatch services to the communication groups and the multi-communication groups, the method comprises the steps of:
   a) providing, by the operator station, the dispatch services to at least two multi-communication groups;
   b) receiving, by the operator station from an operator of the operator station, a request to perform at least one particular dispatch service for the at least two multi-communication groups, wherein the request requires the at least two multi-communication groups to be combined into a temporary multi-communication group, thereby forming a temporary multi-communication group in addition to the at least two multi-communication groups;
   c) performing, by the operator station, the at least one particular dispatch service for the temporary multi-communication group; and
   d) when the at least one particular dispatch service has been performed or when a higher priority service request is received, returning, by the operator station, the temporary multi-communication group to the at least two multi-communication groups;

and wherein, while the temporary multi-communication group exists, the operator, by use of the operator station retains the ability to conduct dispatch services with the at least two multi-communication groups, and members of the temporary multi-communication group are prevented from communicating with members of the at least two multi-communication groups.

6. The method of claim 5 further comprises the steps of:
   e) prior to performing the at least one particular dispatch service, modifying, by the operator station, the temporary multi-communication group based on the request and predetermined communication system limitations.

7. The method of claim 6 further comprises modifying the temporary multi-communication group by adding at least one communication group to the temporary multi-communication group.

8. The method of claim 6 further comprises modifying the temporary multi-communication group by deleting at least one communication group from the temporary multi-communication group.

9. In the method of claim 5, step (d) further comprises performing an emergency call as the at least one particular dispatch service.

10. In a communication system that includes a plurality of communication units that are arranged into communication groups, a limited number of communication resources that the communication groups access for communications, and at least one operator station, wherein the at least one operator station provides dispatch services for communications groups and multi-communication groups, a method for the at least one operator station to selectively provide dispatch services to the communication groups and the multi-communication groups, the method comprises the steps of:
   a) providing, by the operator station, the dispatch services to the at least one communication group;
   b) receiving, by the operator station from an operator of the operator station, a request to perform at least one particular dispatch service for the at least one communication group, wherein the request requires the at least one communication group to be temporarily combined with at least a second communication group;
   c) temporarily combining, by the operator station, the at least one communication group and the at least a second communication group based on the request and predetermined communication system limitations, thereby forming a temporary super-communication group in addition to the multi-communication groups;
   d) performing, by the operator station, the at least one particular dispatch service for the temporary super-communication group; and
   e) when the at least one particular dispatch service has been performed or when a higher priority service request is received, returning, by the operator station, the temporary super-communication group to the at least one communication group and the at least a second communication group;

and wherein, while the temporary super-communication group exists, the operator, by use of the operator station, retains the ability to conduct dispatch services with the multi-communication groups, and members of the temporary super-communication group are prevented from communicating with members of the multi-communication groups.

11. In the method of claim 10, step (c) further comprises modifying the temporary super-communication group by adding at least one multi-communication group to the temporary super-communication group.

12. In the method of claim 10, step (d) further comprises performing an emergency call as the at least one particular dispatch service.

* * * * *